United States Patent
Li et al.

(10) Patent No.: US 7,604,162 B2
(45) Date of Patent: Oct. 20, 2009

(54) METHOD AND SYSTEM FOR MANAGEMENT OF TERMINAL DEVICES

(75) Inventors: Kepeng Li, Shenzhen (CN); Xiaoqian Chai, Shenzhen (CN); Xiaoyi Dong, Shenzhen (CN); Guiyu Zhao, Shenzhen (KR); Jiangshui He, Shenzhen (CN); Hongtao Gao, Shenzhen (CN); Jianzhang Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 11/482,506

(22) Filed: Jul. 6, 2006

(65) Prior Publication Data

US 2007/0158404 A1 Jul. 12, 2007

(30) Foreign Application Priority Data

Dec. 9, 2005 (CN) .................. 2005 1 0130428

(51) Int. Cl.
*G06M 1/06* (2006.01)
(52) U.S. Cl. .................. 235/376; 235/380; 455/418
(58) Field of Classification Search .................. 235/375, 235/376, 385; 455/419
See application file for complete search history.

(56) References Cited

U.S. PATENT DOCUMENTS

| 5,542,120 | A * | 7/1996 | Smith et al. .................. 455/425 |
| 5,819,177 | A * | 10/1998 | Vucetic et al. .................. 455/425 |
| 6,970,917 | B1 * | 11/2005 | Kushwaha et al. .......... 709/217 |
| 2001/0006891 | A1 * | 7/2001 | Cho .................. 455/425 |
| 2002/0083145 | A1 * | 6/2002 | Perinpanathan ............ 709/213 |
| 2002/0194207 | A1 * | 12/2002 | Bartlett et al. ............. 707/203 |
| 2003/0037254 | A1 * | 2/2003 | Fischer et al. .............. 713/200 |
| 2004/0010579 | A1 * | 1/2004 | Freese .................. 709/223 |
| 2004/0019668 | A1 * | 1/2004 | Kakadia .................. 709/223 |
| 2004/0225694 | A1 * | 11/2004 | Flanagin et al. ............. 707/201 |
| 2005/0213511 | A1 * | 9/2005 | Reece et al. ................. 370/252 |
| 2005/0289229 | A1 * | 12/2005 | Kim .................. 709/223 |
| 2006/0026228 | A1 * | 2/2006 | Kim .................. 709/202 |
| 2006/0050888 | A1 * | 3/2006 | Svensson .................... 380/277 |
| 2007/0093243 | A1 * | 4/2007 | Kapadekar et al. .......... 455/419 |
| 2007/0136390 | A1 * | 6/2007 | Blum et al. .................. 707/201 |
| 2008/0168127 | A1 * | 7/2008 | Hernandez .................. 709/202 |

(Continued)

FOREIGN PATENT DOCUMENTS

CN 1512429 7/2004

(Continued)

*Primary Examiner*—Seung H Lee
*Assistant Examiner*—Christle I Marshall
(74) *Attorney, Agent, or Firm*—Townsend and Townsend and Crew LLP

(57) ABSTRACT

The present invention relates to a method and a system for management of terminal devices. The core of the present invention is as follows: a terminal device monitors and acquires events generated in the terminal device under offline conditions, and reports the events to a management side, after establishing communication with the management side. The aforementioned management side then performs management of the terminal device. With the present invention, the terminal events can be monitored, and the terminal device can be managed based on the monitored terminal events. Thus, the adverse impact of the terminal events on the terminal device may be prevented and eliminated in a timely fashion. This reduces the probability of equipment errors, and thus improves the service quality of the service provider.

23 Claims, 11 Drawing Sheets

U.S. PATENT DOCUMENTS

2008/0208928 A1 * 8/2008 Hernandez .................. 707/203

FOREIGN PATENT DOCUMENTS

| CN | 1567843 | 1/2005 |
| CN | 1621663 | 6/2005 |
| WO | WO 00/67499 | 11/2000 |
| WO | WO 2004/082214 | 9/2004 |

* cited by examiner

METHOD AND SYSTEM FOR MANAGEMENT OF TERMINAL DEVICES

CROSS-REFERENCES TO RELATED APPLICATIONS

This application claims priority to Chinese Patent Application No. 200510130428.9, filed Dec. 9, 2005, commonly assigned, incorporated by reference herein for all purposes.

BACKGROUND OF THE INVENTION

The present invention relates to the communication field, and in particular, it relates to the management of equipment resources.

Terminal devices, such as mobile phone terminals, handheld computers, notebook computers, plug-in equipment, vehicle-mounted systems, are all important components of the overall mobile operating service system. Recently, the ever-growing demand for terminal devices with more complete and complex features has also led to the increased probability of generating a whole set of new problems related to terminal devices. To effectively ensure a good user experience, enhance user loyalty, maintain high quality service, as well as provide low-cost and efficient maintenance of the equipment, all service providers and terminal manufacturers are very concerned about technology related to the management, diagnosis and maintenance of terminal devices.

The prior art relates to the present invention proposes a DM system framework, protocol, and communication mechanism for the management of terminal devices based on OMA (Open Mobile Alliance) and DM (Device Management) standard definition. The core of this proposal is as follows: the DMS (Device Management Server) sends out the relevant operation command, such as Add (add), Copy (copy), Delete (delete), to the MO (Management object) of the management tree stored in the terminal device using the OMA DM protocol, to manage device resources via operation of the management tree.

The existing technology is based on a DM system framework defined by the OMA DM standard. The stated framework, as shown in FIG. 1, includes the DMS (Device Management Server) and the terminal unit. DM Agent (DM Agent) and management tree are configured to the aforementioned terminal device. The aforementioned DM Agent is responsible for decoding the content of the OMA DM protocol, converting the management operation command sent by the DMS into an executable command by the terminal, and notifying the terminal to execute. The aforementioned management tree organizes all usable management objects in the terminal unit into a tree-structure, for example, the tree-structure shown in FIG. 2. Each management object may contain a set of environment configuration parameters in that unit, different types of objects, the relevant operation and certain triggering mechanisms, etc. The management objects are identified by the unique URI (Unified Resource Identity).

Based on the aforementioned DM system framework, the DM server manages terminal devices by carrying out activities such as error detection, diagnosis, and repair, as shown in the flowchart 3, which includes the following:

Step 1: A user calls the Customer Center of the service provider to report a terminal device issue.

Step 2: The Customer Center queries the terminal device reported by the user through the device management server.

Step 3: The terminal device reports the relevant configuration information to the DM server; the DM server diagnoses the configuration information and selects the adequate application program.

Step 4: The DM server requests the user for authorization, and queries the user whether or not downloading an application is necessary.

Step 5: User grants authorization.

Step 6: DM server performs installing, running, or deleting the application in the aforementioned terminal device.

The terminal device carries out repair operations according to the application issued by DM server.

Step 7: The terminal device sends confirmation information to DM server to report that error has been repaired.

It is clear that the aforementioned technical proposal of the existing technology has the following drawbacks.

With the existing technology, the user must request the Customer Center for assistance when the terminal device encounters a problem. That is, the existing technology does not allow the DM system to monitor the event occurring in the terminal. Certain terminal events, for example, the user modified certain operational parameters of the terminal device; the user downloaded and installed some new software via non-DM route (through Website, WAP site, etc.); or certain applications on the terminal device modified certain parameter settings on the terminal device, etc. are critical to the achievement of optimal device management. If the device management system is capable of monitor terminal events, errors can be prevented in advance. For example, when a user attempts to modify an operational parameter into a wrong value, the terminal monitoring program can alert the user that such a modification can render the operation unusable; or when a user installs new software, the terminal monitoring program can report this event to the device management system for future management. Therefore, management of the terminal device according to monitoring terminal events is needed, in order to prevent and timely eliminate the adverse impact of terminal events on the terminal devices.

BRIEF SUMMARY OF THE INVENTION

The purpose of the present invention is to provide a method and a system for management of the terminal device. With the present invention, it is possible to monitor terminal events, perform management on the terminal device, based on monitoring terminal events. Thus, it can prevent and timely eliminate the adverse impact of terminal events on the terminal devices.

The purpose of the present invention will be realized via the following technical proposal:

The present invention provides a method of management for terminal devices, which includes:

A. a terminal device monitoring and acquiring events generated in the terminal device under offline conditions, and reporting the events to a management side, after establishing communication with the management side;

B. the aforementioned management side carrying out management of the aforementioned terminal device on the basis of said events.

Wherein the aforementioned step A specifically comprising:

A1. after the management side establishing communication with the terminal device, the management side issuing monitoring tasks to the terminal device;

A2. the terminal device monitoring and acquiring events generated in the terminal device under offline conditions according to a message of said monitoring tasks, and then establishing communication with the management side for reporting the monitoring events to the management side.

Wherein said monitoring tasks including:

appointed certain event monitoring items, recording conditions and strategies and/or reporting conditions and strategies.

Wherein said event monitoring items including:

an user installing or updating applications on the terminal device via non-DM mode; and/or, the user or an application on the terminal device modifying management objects and attributes offline in a device management tree on the terminal device; and/or, the user or the application on the terminal device modifying configuration parameters offline.

Wherein prior to issuing the monitoring tasks to the terminal device by the management side in step A1 also including:

the management side issuing a monitoring event authorization request to the user, and said user granting an authorization.

Wherein between step A1 and step A2 including: the terminal device storing said monitoring tasks through management objects.

Wherein said management objects including:

an event identification node, a report node, a report condition node and an enabling node.

Wherein said management object also including:

a recording node and a recording condition node.

Wherein said step A2 specifically including:

A21. under offline conditions, the terminal device monitoring certain event monitoring items appointed according to the monitoring task acquisition, and acquiring the events generated in the terminal device;

A22. after establishing communication with the management side, the terminal device reporting the event acquisition to the management side on the basis of reporting conditions and strategies of said monitoring task.

Wherein the step A21 and the step A22 also including:

recording said corresponding event acquisition to the terminal device on the basis of the recording conditions and the strategies of said monitoring task.

Wherein prior to the step A21, or prior to the step A22 in a process of reporting the event acquisition to the management side also including:

the terminal device sending a request to the user requesting authorization for monitoring the events, and then receiving reply from said user with an authorization grant.

Wherein the process of monitoring and acquiring events generated in the terminal device in steps A, A2, A21 specifically including:

when the events generated in the terminal device are monitoring items where the user installing or updating applications on the terminal device using non-DM mode, the terminal device through a preset event information collecting point querying and analyzing system logs or application tables on a system, and acquiring a new installation or update of application information on the terminal device; or, the terminal device acquiring the new installation or update application information via message reporting in real-time by a lower level firmware;

or, when the events generated in the terminal device are monitoring items where the user or the application on the terminal device modifies management objects and attribute offline in a device management tree on the terminal device, the terminal device collecting event information through the preset collecting point and analyzing the value and attribute of a management object node, and acquiring information on changes of the value and an attribute of the management object node in the terminal device; or, the terminal device acquiring the information on changes of the value and the attribute of the management object node in the terminal device through receiving message reporting in real-time by the lower level firmware;

or, when the events generated in the terminal device are monitoring items where the user or the application on the terminal device offline modifies a configuration parameter on the terminal device, the terminal device collecting information through the preset event information collecting point and analyzing the configuration parameter, and acquiring information on changes of the configuration parameter on the terminal device; or, the terminal device acquiring information on changes of an operation parameter/configuration on the terminal device through receiving the message reporting in real-time by the lower level firmware.

Wherein the process of said event reporting to the management side in the steps A, A2, and A22 specifically comprising:

the monitoring events are reported to the management side through a notification Alert message, and said message carries the Unified Resource Identity (URI) of a management object of a generated event, the notification type (Alert type), and the event generation.

Wherein said step B specifically including:

B1: the management side acquiring download application information through the non-DM mode on the basis of the Alert message reporting by the terminal device, and recording relevant information of the application installed on said terminal device;

B2: updating corresponding information of the management object on the management tree on the terminal device, on the basis of relevant recording information of said application;

or,

B3: the management side acquiring values of the management object on the management tree on the terminal device, on the basis of the Alert message reported from the terminal device, and using that for updating the values of the corresponding management object recorded within.

or,

B4: the management side acquiring configuration parameter reporting from the terminal device on the basis of the Alert message reported from the terminal device, and then deciding a corresponding management strategy with regards to said event, according to a class of the preset configuration parameter.

B5: the management side selecting an adequate parameter value on the basis of the decision of the management strategy, and issuing this parameter value to the terminal device for repairing a parameter modification.

Wherein said step B also including:

the terminal device receiving parameter values issued from the management side, and using them to update original parameter modifications.

Wherein said step B also including:

the terminal device requesting user authorization for repairing the parameter modifications, and acquiring user confirmation.

A system for management of terminal devices characterized by including a management side and a terminal device;

the terminal device monitoring and acquiring events generated in the terminal device under offline conditions, and reporting an acquisition of events to the management side; the management side deciding a corresponding management operation according to monitoring results reported from the terminal device.

Wherein said management side including a monitoring task management unit, which is used for issuing monitoring tasks to said terminal device.

Wherein said management side also including a monitoring result processing unit, for deciding a corresponding management operation on the terminal device, on the basis of the monitoring results reported by the terminal device.

Wherein said terminal device comprising a monitoring engine for receiving monitoring tasks issued by the management side, carrying out an allocation of said monitoring tasks, monitoring and acquiring events generated in the terminal device on the basis of said monitoring tasks, and establishing a communication with the management side and reporting the event acquisition to the management side.

Wherein said monitoring engine including an allocation unit for receiving monitoring tasks issued by said management side, and the allocation of the corresponding monitoring items, recording conditions and reporting conditions on the basis of said monitoring tasks.

Wherein said monitoring engine also comprising a monitoring unit and a reporting unit;

said monitoring unit monitoring events generated in the terminal device on the basis of the monitoring item allocation of said allocation unit, then transferring the monitoring results to the reporting unit; said reporting unit reporting of the monitoring results to the management side, according to the reporting condition allocation by said allocation unit.

Wherein said monitoring engine also including a recording unit for recording monitoring results by said monitoring unit, on the basis of the recording condition configuration by the configuration unit.

It is clear from the technical proposal provided by the aforementioned present invention that the present invention monitors and acquires events generation in the terminal device while the device is in the offline state. It then establishes communication with the management side and reports the captured event to the management side. The aforementioned management side then carries out the management activities of the aforementioned terminal device, based on the aforementioned events. With the present invention, it is possible to monitor terminal events and perform management on the terminal device based on the monitored terminal events. Thus, it can prevent and timely eliminate the adverse impact of terminal events on the terminal devices.

DETAILED DESCRIPTION OF THE INVENTION

Normally, the device management system is capable of carrying out many management operations on the mobile terminal. At the same time, the user may perform certain offline operations to the mobile terminal. The application program on the terminal is also capable of performing certain operations to the terminal. Certain offline events on the terminal include, but are not limited to, the follow scenarios:

1. The user modifies the operation parameter on the terminal device.
2. The user manually installs firmware upgrade kits without interacting with the management side.
3. The user downloads new software through non-DM route (for example Website, WAP site, etc.) and installs to the terminal device.
4. The application which is installed on the terminal modifies certain parameter settings.

The DM server needs to acquire the relevant information of these offline events in order to manage the firmware/software on the terminal. Such offline events include: the firmware/software information that the user downloaded and installed offline through non-DM method, the parameter on the terminal device and the offline modification information of the management object.

The core of the present invention is as follows: the terminal device monitors and acquires the event generating in the terminal device under off-line conditions, and reports the event to the management side after establishing communication with the management side. Then, the aforementioned management side performs management of the aforementioned terminal device.

Figure 1:
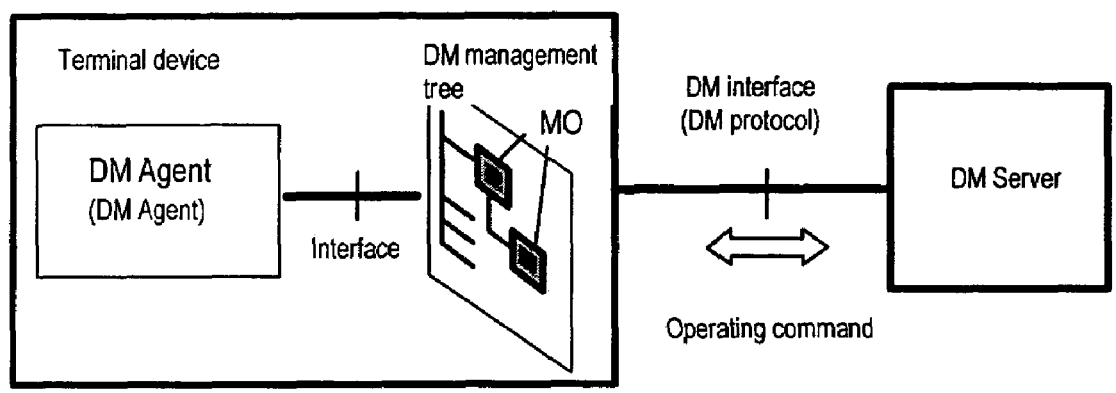
FIG. 1 is a framework drawing of the DM system provided by the existing technology.
Figure 2:
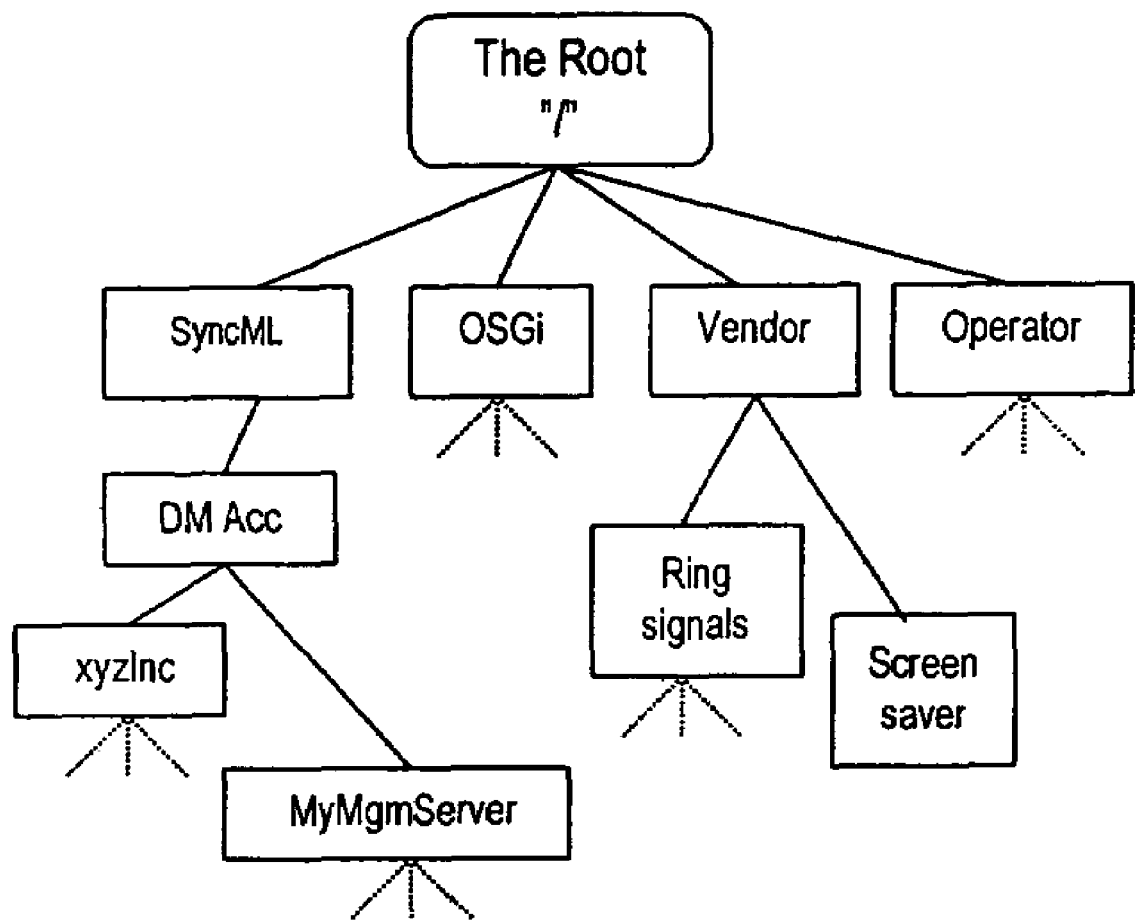
FIG. 2 is a tree structure drawing of the management tree provided by the existing technology.
Figure 3:
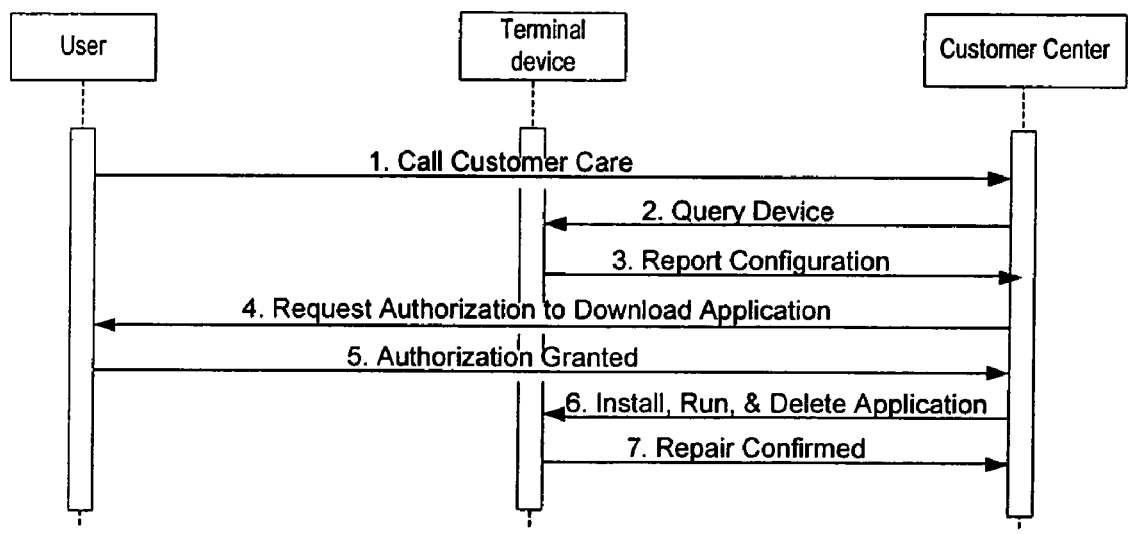
FIG. 3 is a flowchart of the DM server carrying out management on the terminal device.
Figure 4:
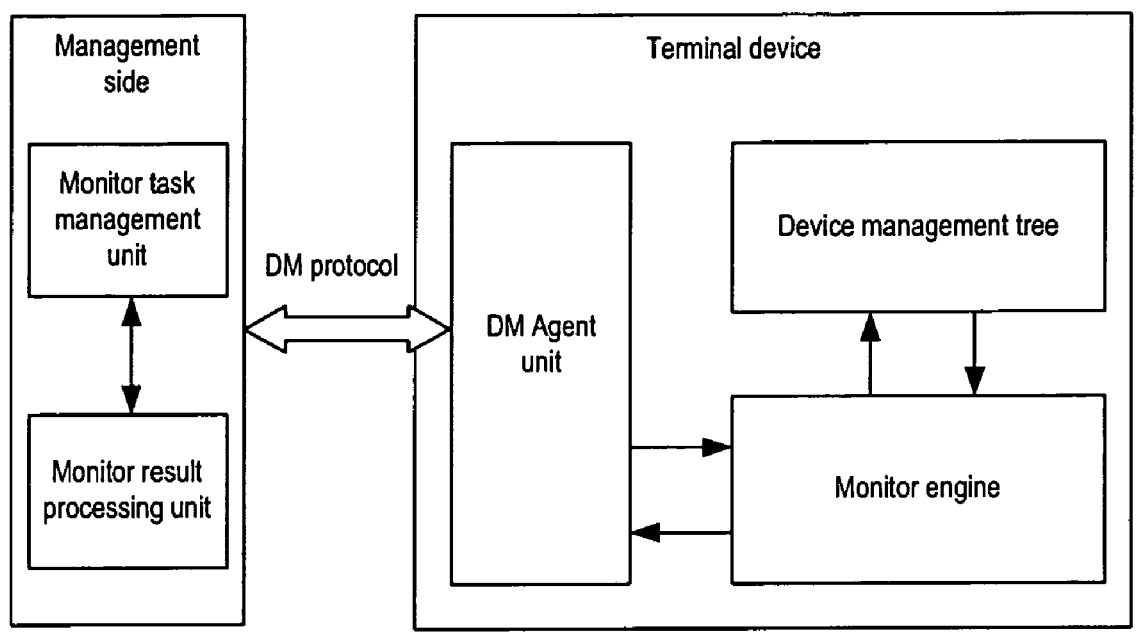
FIG. 4 is a system framework of a working example provided by the present invention.

Addressing the system described in the present invention, the first working example provided by the present invention, as shown in FIG. 4, includes the management side and terminal device, the monitor task management unit and monitor result processing unit of the aforementioned management side. The aforementioned terminal device includes the monitor engine, DM Agent unit, and device management tree.

The management side exchanges data with the DM Agent unit in the terminal device via the DM protocol, and manages the management object in the device management tree via the aforementioned exchanged data.

When the management side and the terminal device exchange information, the aforementioned management side issues a monitoring task to the terminal device via the aforementioned monitor task management unit. The DM Agent unit of the terminal device receives the aforementioned monitoring task and sends the task to the monitoring engine. The aforementioned monitoring engine allocates the corresponding monitoring strategy, such as monitoring items, monitoring result recording conditions, and monitoring result report conditions, according to the aforementioned monitoring task. Then, the monitoring engine acquires the events generation in the terminal device according to the aforementioned monitoring item, through the logs recording in the system and the application table information. Next, the monitoring engine removes the events generation via the DM server mode among the aforementioned events, and the corresponding events report to the management side based on the reporting conditions. The monitoring result processing unit of the aforementioned management side performs the corresponding process to the aforementioned monitoring results, and performs management of the aforementioned terminal device based on processing data, for example, parameter allocation, error diagnosis, and firmware/software upgrade, etc.

Figure 5:
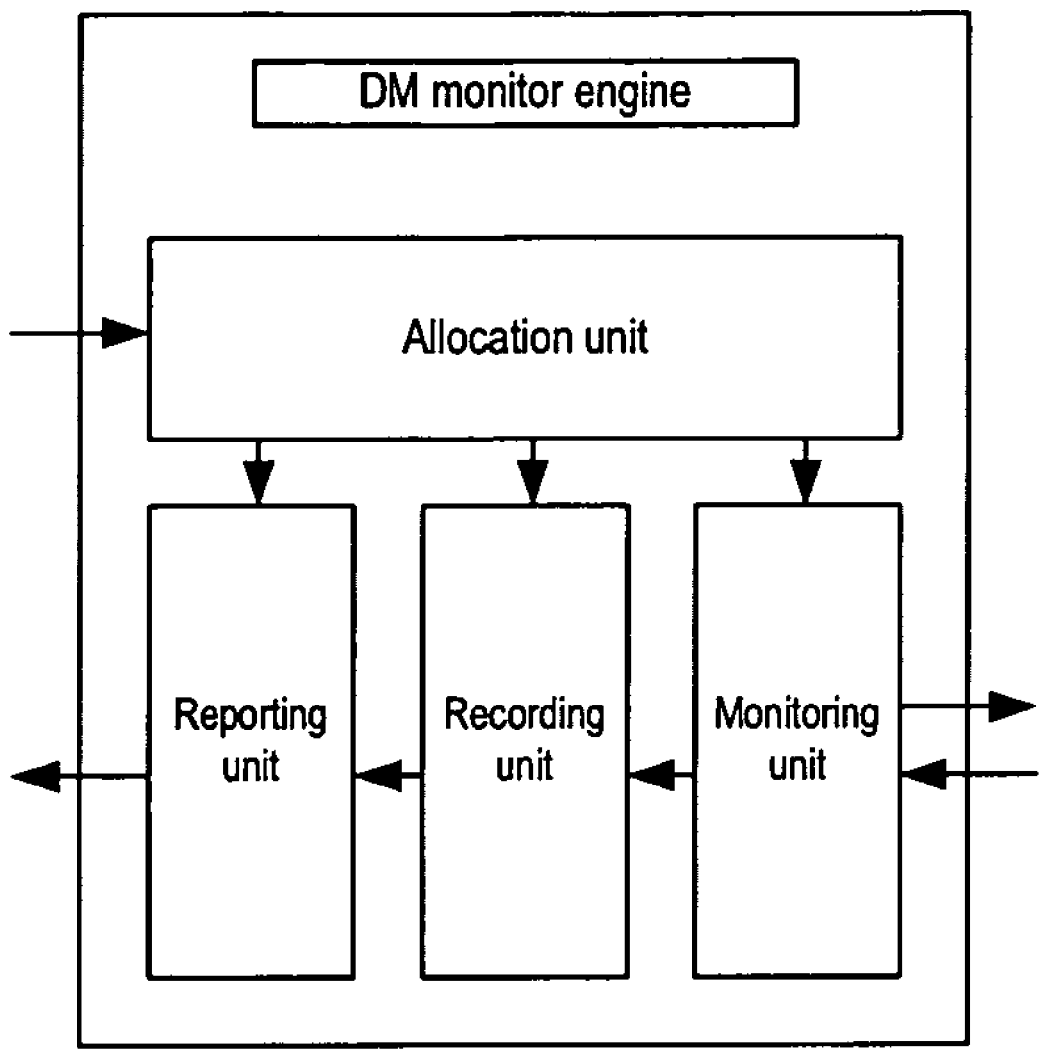
FIG. 5 is a configuration drawing of the monitor engine in the aforementioned working example of the present invention.

The aforementioned monitoring engine monitors the terminal events through the components as shown in FIG. 5, and these components include the allocation unit, the monitoring unit, the recording unit, and the reporting unit.

After the monitoring engine receives the monitoring task, it transfers the aforementioned monitoring item to the monitoring unit, via the corresponding monitoring strategy allocated by the allocation unit, such as the monitoring item, recording condition and/or reporting condition, etc.; transfers the aforementioned recording condition to the recording unit, and transfers the aforementioned reporting condition to the reporting unit.

The aforementioned monitoring unit monitors the event generation in the terminal device according to the monitoring item reception. For example, when the monitoring item appoints monitoring offline parameters, then the monitoring unit monitors the offline parameter in the terminal device; when the monitoring item appoints to monitor the information about whether the system is downloading new applications, then the monitoring unit monitors the new application download in the terminal device via the non-DM mode. When the aforementioned monitoring unit monitoring the event generation in the terminal device, it transfers the relevant information about the aforementioned event to the recording unit.

The aforementioned recording unit records the aforementioned monitoring events according to the recording conditions reception. For example, if the user modified offline parameters, then it is needed to decide whether the aforementioned parameter is within the acceptable range, and whether or not it meets the recording conditions. If it meets the recording conditions, then the recording unit records the relevant information about the aforementioned event, and then transfers the aforementioned information record to the reporting unit.

The aforementioned reporting unit reports the receiving event information according to the receiving reporting conditions. At this time, the aforementioned reporting unit first decides whether the event information reception meets the reporting conditions; if it does, it then reports to the aforementioned management side. If the event information reception is not a concern to the management side, that is, it does not meet the reporting conditions, then mask off the aforementioned event information and no longer report it to the management side.

Figure 6:
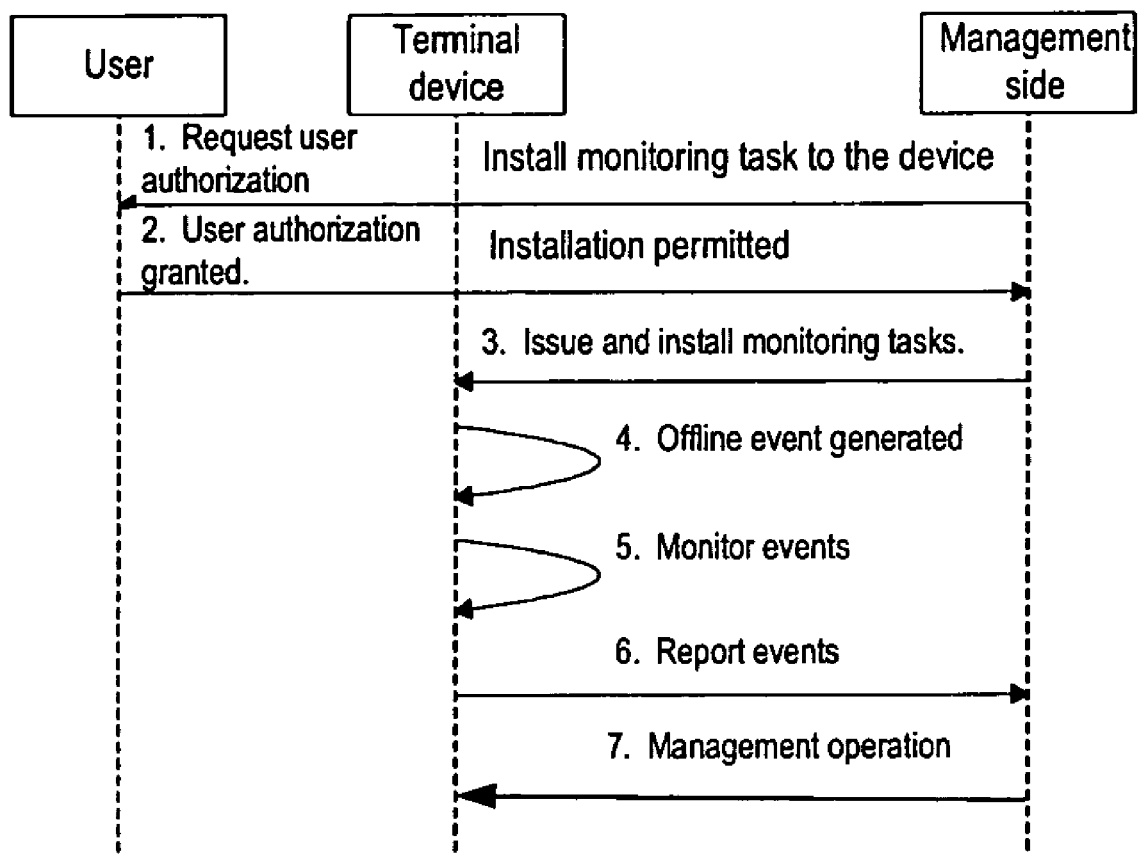
FIG. 6 is a flowchart of the second working example provided by the present invention.

With the aforementioned method of the present invention, the present invention provides the second working example. The main concept behind this example is as follows: when the terminal device is correctly configured and can communicate with the management side, the terminal device monitors the event about the newly downloaded application according to the monitoring task issued by the management side, reports the monitoring results to the management side, and the aforementioned management side then manages the terminal based on the aforementioned monitoring results. The concrete implementation process includes the following as shown in FIG. 6.

Step 1: The management side requests the user authorization to grant authorization for monitoring task on the device.

Step 2: When the aforementioned user requires monitoring, then grant authorization, that is, permit the management side to issue monitoring tasks.

Step 3: The management side issues monitoring tasks to the terminal device and installs on the terminal device.

The aforementioned monitoring tasks include these tasks: appointing a number of event monitoring items, recording conditions and strategies and/or reporting conditions and strategies.

The aforementioned monitoring items include checking whether or not the terminal device downloaded a new application.

The aforementioned recording condition and strategy refer to the particular condition in which the terminal device records the event. For example, the terminal device records the terminal events monitored according to the preset time or according to the specified time interval.

The aforementioned reporting condition/strategy refers to the particular condition in which the terminal device records the event. For example, should it report the monitoring event in real-time, at a certain fixed time point, or should the reporting time be determined according to the severity and urgency of the event, etc.

Figure 7:
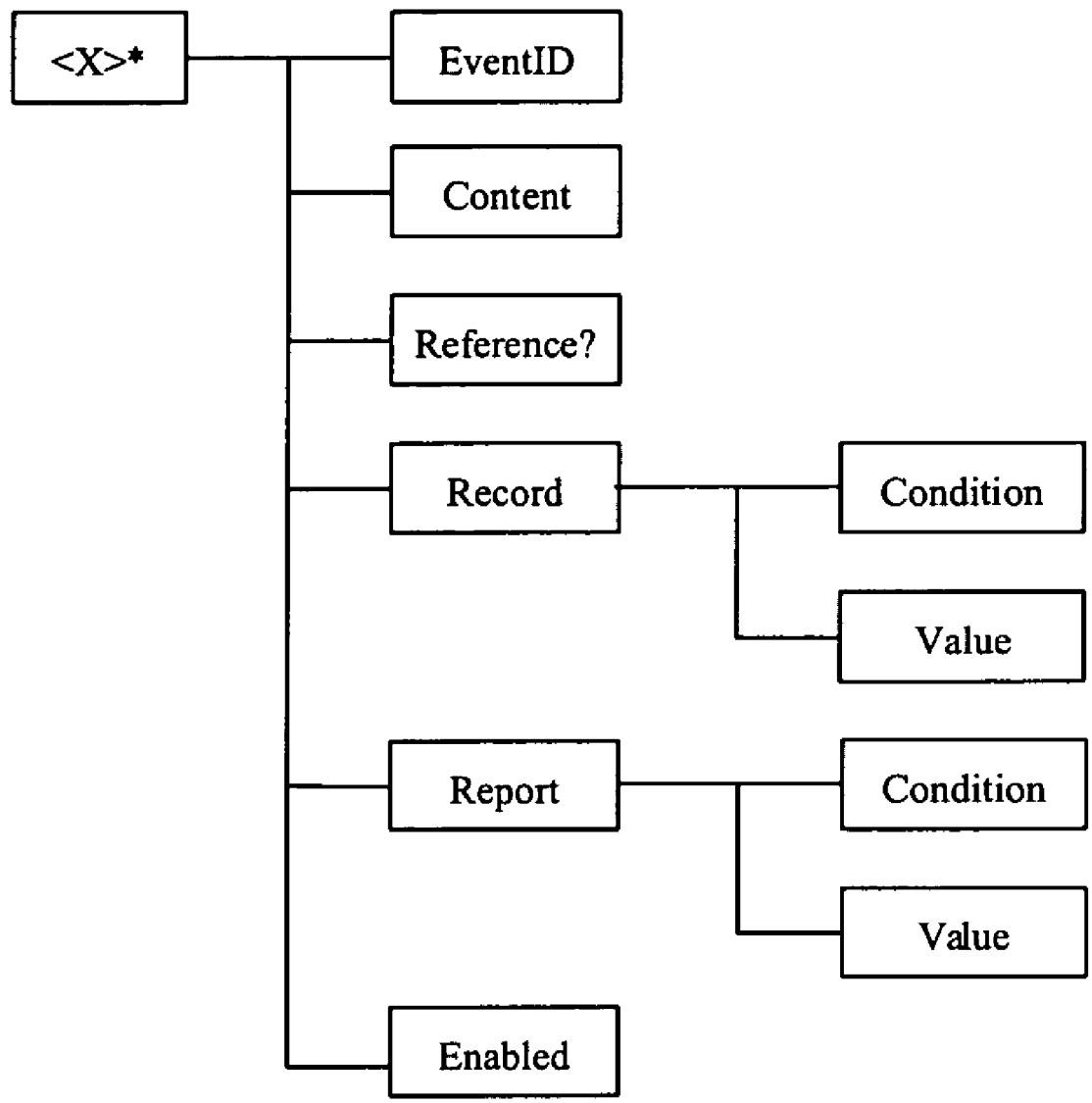
FIG. 7 is a structural drawing of the subtree configured when performing installation of monitor task in the $2^{nd}$ working example provided by the present invention.

When installing monitoring tasks, in order to facilitate the DM server's issuing and installing monitoring tasks, a subtree is configured in the device management tree of the terminal device. The aforementioned subtree structure, as shown in FIG. 7, includes a X node and EventID node under the X node, content node, Reference node, Record node, Report node and Enabled node. Record/Condition node and Record/Value node are set under the aforementioned Record node, and Report/Condition node and Report/Value node are set under the Report node.

The structure and usage of each node among the aforementioned subtree are described below.

X node is the placeholder of the monitoring event item. The child node under this node describes the relevant information about the monitored event item. The structure is shown in the following Table:

TABLE 1

| Tree node | Format | Access permission. |
|---|---|---|
| One Or More | Node | Get |

EventID node is used for identify information of the stored event, and its structure is shown in Table 2.

TABLE 2

| Tree node | Format | Access permission. |
|---|---|---|
| One | Chr | Replace, Get |

The Content node is used to store the content of an event monitoring item and specify the contents that need to be monitored. The structure is as shown in Table 3.

TABLE 3

| Tree node | Format | Access permission. |
|---|---|---|
| One | Chr | Replace, Get |

Reference node is used to store the reference values for the monitoring items. For example, the monitoring parameter, and the reference value of this parameter may be stored for future comparison. Its structure is shown in Table 4.

TABLE 4

| Tree node | Format | Minimum access permission |
|---|---|---|
| One Or Zero | Chr | Replace, Get |

Record node is used to record the monitored event generated in the terminal device. Its structure is shown in Table 5.

TABLE 5

| Tree node | Format | Minimum access permission |
|---|---|---|
| One | Node | Replace, Get |

Record/Condition node is used to store the recording condition for the event monitoring items. Its structure is shown in Table 6.

TABLE 6

| Tree node | Format | Minimum access permission |
|---|---|---|
| One | Chr | Replace, Get |

Record/Value node is used to store the value for recording the event monitoring items. Its structure is shown in Table 7.

TABLE 7

| Tree node | Format | Minimum access permission |
|---|---|---|
| One | Chr | Replace, Get |

Report node is used to store the report the event monitoring items. Its structure is shown in Table 8.

TABLE 8

| Tree node | Format | Access permission. |
|---|---|---|
| One | Node | Replace, Get |

Record/Condition node is used to store the reporting condition. Its structure is shown in Table 9.

TABLE 9

| Tree node | Format | Minimum access permission |
|---|---|---|
| One | Chr | Replace, Get |

Record/Value node is used to store the value of the reported monitoring results. Its structure is shown in Table 10.

TABLE 10

| Tree node | Format | Minimum access permission |
|---|---|---|
| One | Chr | Replace, Get |

Enabled node is used to start and stop monitoring, and its value is True or False. Its structure is shown in Table 11.

TABLE 11

| Tree node | Format | Minimum access permission |
|---|---|---|
| One | Bool | Replace, Get |

Based on the aforementioned subtree, the management side may use Replace command to issue and install the monitoring tasks to the device management tree of the terminal device.

Step 4: Offline event generated in the terminal device.

When the user performs certain offline operation to the terminal device, e.g., the user downloaded and installed firmware/software (applications) through non-DM mode to the terminal, the user modified certain operation parameters on the terminal, or the application installed on the terminal device modified setting parameters on the terminal device, these operations may cause the occurrence of offline events.

Step 5: The terminal device monitors terminal events according to the necessary monitoring items, and reports the monitoring results according to the aforementioned recording conditions and strategies.

In Step 5, when the event generated in the terminal device is the monitoring item that the user installed or the upgraded application program on the terminal device through non-DM mode, the terminal device queries the event data collecting point that has setup and analyzes the system log or the system application table, to acquire the newly installed or upgraded application information in the terminal device; or, captures the newly installed or upgraded application information in the terminal device through a receiving message reported in real-time from lower level firmware.

Figure 8:
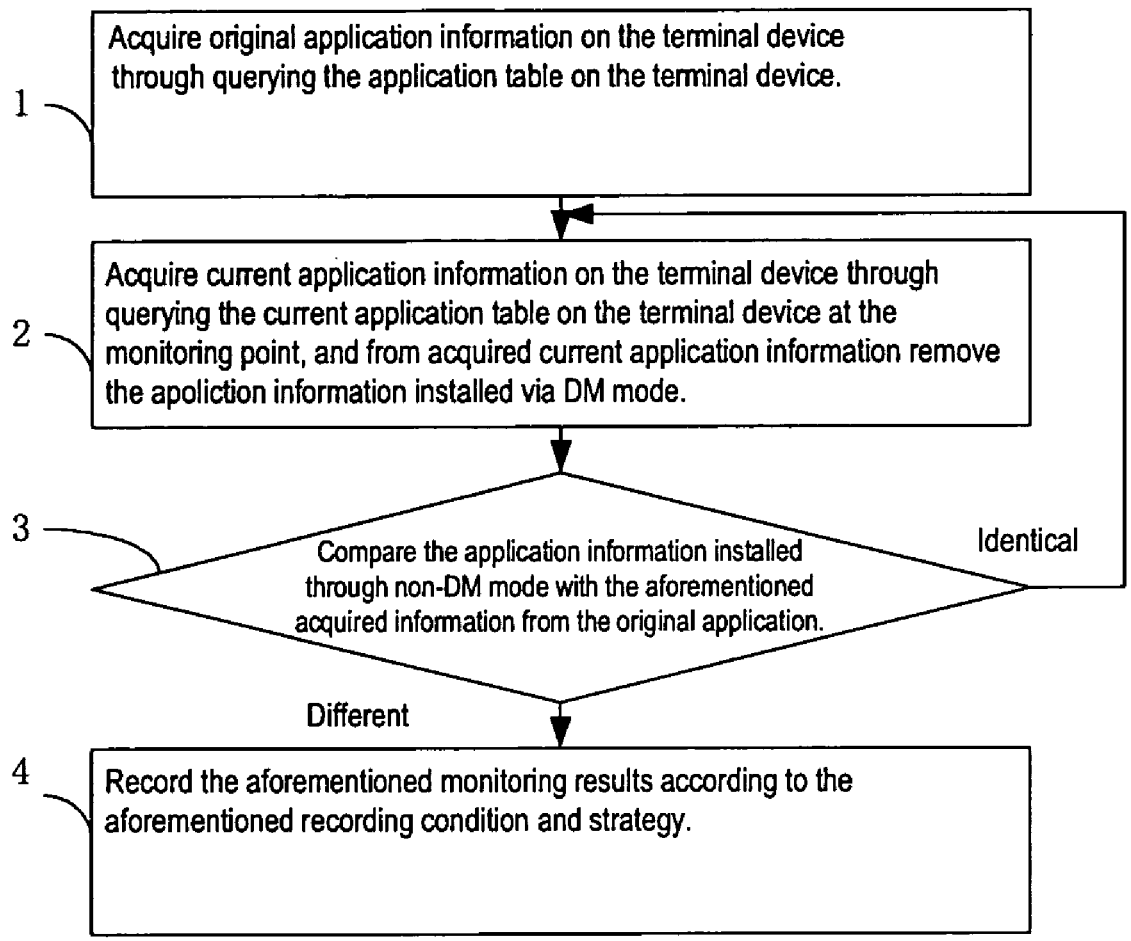
FIG. 8 is a flowchart that shows the terminal device monitoring the terminal events through querying the application table in the $2^{nd}$ working example provided by the present invention.

Among them, when the terminal device monitors the terminal event through querying the application table, the monitoring flow, as shown in FIG. 8, includes the following.

Step 1: The terminal device acquires original application information on the terminal device through querying the application table.

Step 2: Get current application information on the terminal device via querying the current application table on the terminal device; from acquired current application information remove the application information installed via the DM mode.

Step 3: Compare the application information installed via non-DM mode with the acquired original application information mentioned above. If identical, then continue to execute step 2, otherwise execute step 4.

Step 4: Record the aforementioned monitoring results according to the aforementioned recording condition and strategy.

Figure 9:
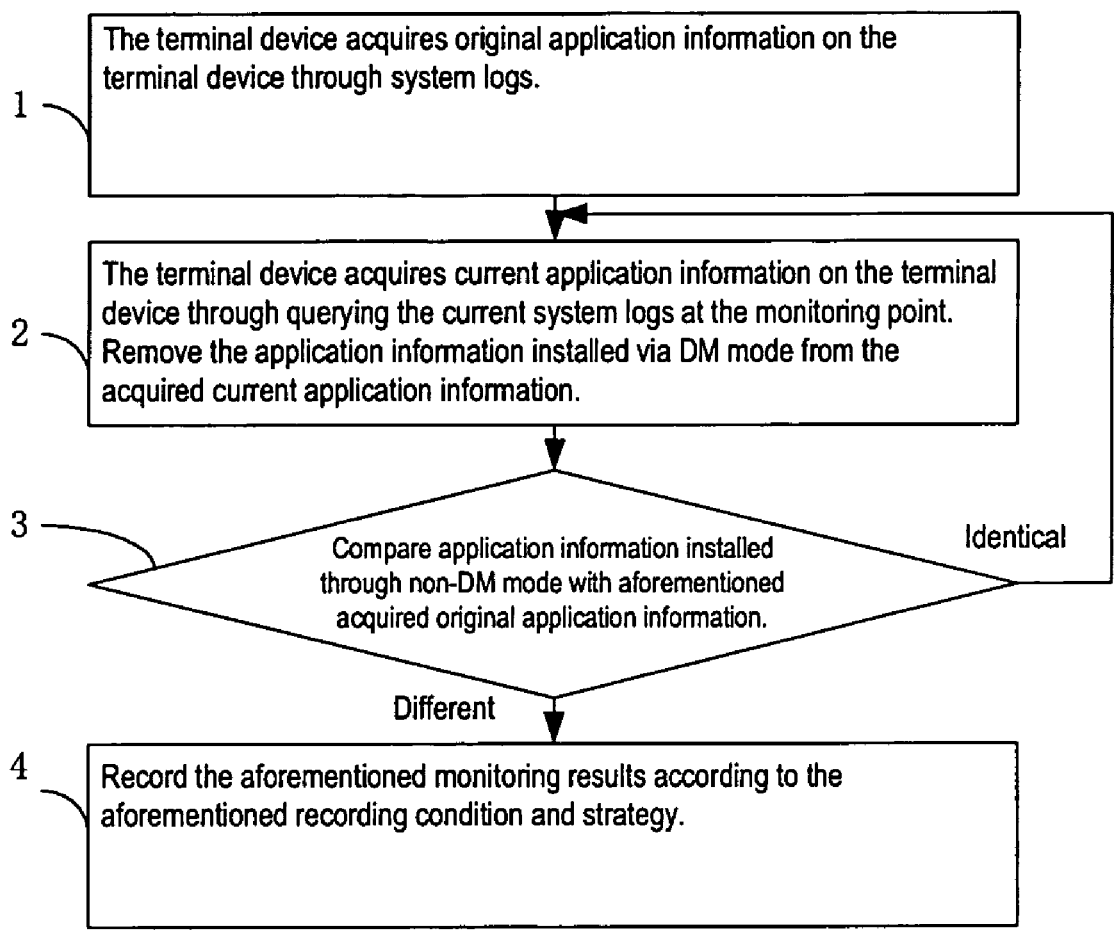
FIG. 9 is a flowchart that shows the terminal device monitoring the terminal event by querying the system log in the $2^{nd}$ working example provided by the present invention.

Additionally, when the terminal device acquires the newly-installed application information via querying the system recorded log information, the monitoring flow, as shown in FIG. 9, includes the following:

Step 1: The terminal device acquires the original application information on the terminal device through system logs.

Step 2: The terminal device acquires current application information on the terminal device through querying the current system logs at the monitoring point, and then removes the application information installed via the device management mode from the acquired current application information.

Step 3: Compare the aforementioned acquired original application information with the application information installed via non-DM mode. If identical, then continue to execute step 2, otherwise execute step 4.

Step 4: Record the aforementioned monitoring results according to the aforementioned recording condition and strategy.

In order to realize real-time terminal event monitoring via the real-time monitoring method, there are two specific modes of implementation.

The first mode provides a recording event function interface via the monitoring engine of the terminal device. Then, when the terminal receives monitoring tasks, the monitoring engine registers this function interface to the lower level firmware of the system. After this process, the system lower level firmware automatically invokes the registered function interface after an event generation, and completes monitoring and recording the event operation.

The second mode defines an event message handling function via the monitoring engine in the terminal device. Then, when the terminal device receives monitoring tasks, the monitoring engine registers the aforementioned message handling function registered in the lower level firmware of the system, and associates the event message with the handling function. After an event is generated in the terminal device, the system lower level firmware will generate a corresponding event message and transmit the aforementioned message to the terminal device. In accordance with the associated relationship of the register, the monitoring engine in the terminal device via the received message of the message handling function and the processing/handling of this function completes the monitoring and recording of the event operation.

After undergoing the execution process of Step 5, the monitoring and recording of the application downloaded in the terminal device will be completed. Continue on to execute the following steps:

Step 6: The terminal device reports the aforementioned monitoring results to the management side according to the aforementioned reporting condition and strategy.

After the terminal device records the monitoring results based on the reporting strategy/condition, report the monitoring results to the management side via the Generic Alert message. The aforementioned Alert message contains the following information: integer return code, data source URI, Alert type information, and Correlator (correlator). The aforementioned Alert type information can be defined as the following: "org.openmobilealliance.dm.monitoring.report (a report on the organization of open mobile alliance device monitoring)."

Step 7: The aforementioned management side performs terminal device management according to the aforementioned reporting results.

After the management side receives the message reported from the terminal device, it learns about the monitoring results reported from the terminal device based on the Alert type information in the aforementioned message. At this juncture, it obtains application information that is downloaded via the non-DM mode, and records the relevant application information installed on the aforementioned terminal device, in order to help facilitate the successive management operation. For example, it adds the application that the user installed offline to the management tree of the terminal device, or updates the corresponding information of the management objects on the management tree of the terminal device. If the management side does not receive the Alert type information, then it will not confirm the content reported by the terminal.

The $3^{rd}$ working example is provided based on the aforementioned method of the present invention. The core of this working example is to carry out monitoring at the management object node via the terminal device monitoring of the device management tree. The concrete implementation process, as shown in FIG. 6, includes the following:

Step 1: The management side requests the user to grant authorization to issue monitoring tasks to the device.

Step 2: When the aforementioned user needs to be monitored, then grant authorization, that is, permit the management side to issue monitoring tasks.

Step 3: The management side issues monitoring tasks to the terminal device and installs these tasks on the terminal device.

The aforementioned monitoring tasks include the following: appointing a number of event monitoring items, recording condition and strategy and/or reporting condition and strategy.

Step 4: Offline event generated in the terminal device.

Step 5: The terminal device monitors terminal events according to the necessary monitoring items, and reports the monitoring results according to the aforementioned recording conditions and strategies.

Figure 10:
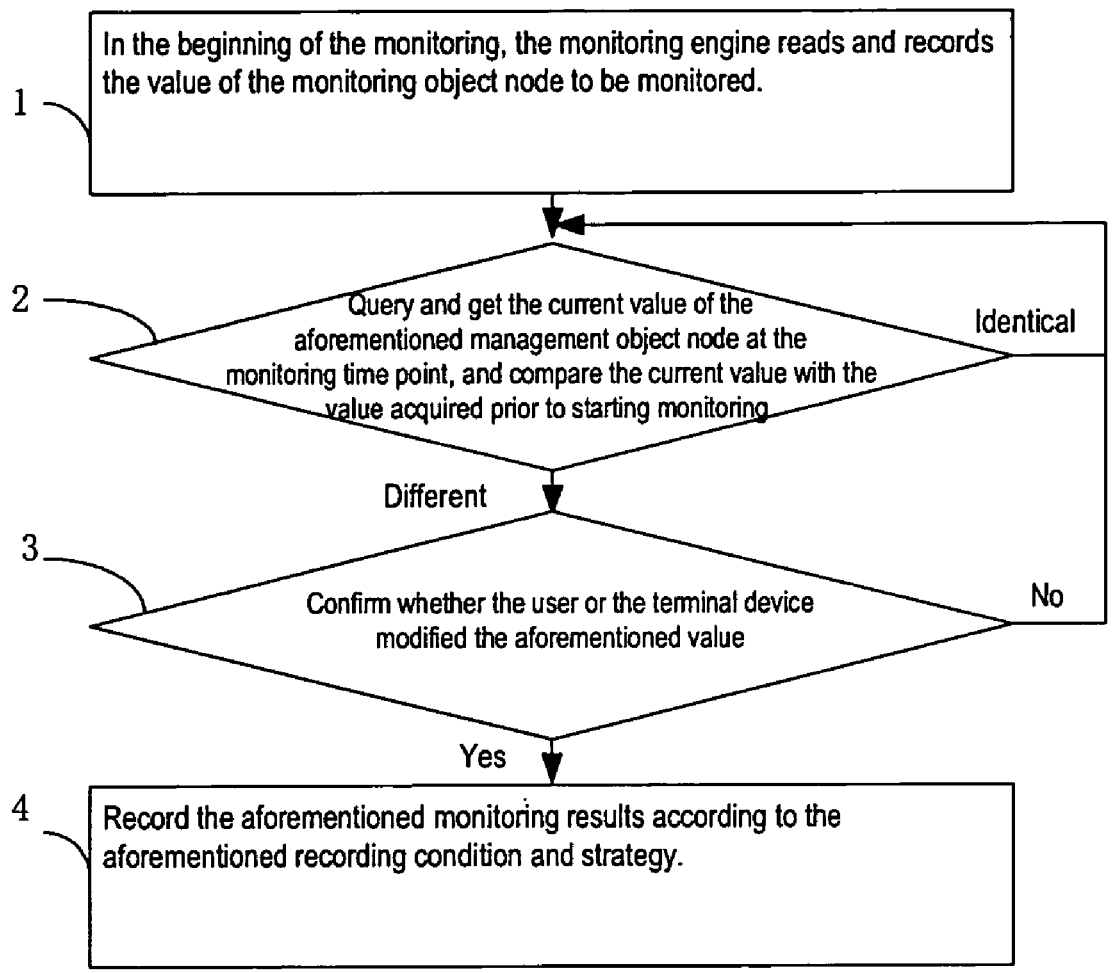
FIG. 10 is a flowchart of the $3^{rd}$ working example provided by the present invention.

During the DM process, the application (including firmware and software), parameters and some basic terminal device information are stored on the device management tree via the mode of management object (MO). Therefore, when the events generated in the terminal device belong to the monitoring items of the management object and attribute on the device management tree in the terminal device that the user or applications on the terminal device modified offline, it only needs to monitor the management tree. The process of monitoring the management tree includes two scenarios:

The first scenario is that the terminal device collects event information at the preset collecting point, analyzes the value and attribute of the management object node, and then obtains the change information of the value and attribute of the management object node in the terminal device. The real-time process, as shown in FIG. 10, includes the following:

Step 1: At the beginning of the monitoring, the monitoring engine reads and records the value of the management object node to be monitored.

Step 2: The monitoring engine queries at the monitoring time point and obtains the current value of the aforementioned management object node, based on the allocated recording condition and strategy in the monitoring tasks. It then compares the current value with the value acquired before the beginning of the monitoring process. If both values are different, then execute Step 3, otherwise continue to execute Step 2.

Step 3: Confirm whether the user or the terminal device modified the aforementioned values by themselves. If they did, then execute Step 4, that is, record the monitoring results according to the preset recording condition and strategy. If the DM server modified the value of the management object node during monitoring, then ignore the parameter modification and switch to Step 2.

The second scenario is to acquire the change information of the value and attribute of the management object node in the terminal device, according to the received real-time reported message from the firmware. Under such circumstances, it is necessary that a specific function is set to the DM Agent on the terminal device, in order to process the MO modification operation exclusively. Through reloading this function, while you let the DM Agent perform modifications to some MO nodes that require monitoring, initiate a report to the monitoring engine. Then record the relevant information to attain the purpose of real-time monitoring.

After undergoing a series of processes in the aforementioned step 5, the terminal device records the aforementioned monitoring results, then executes the following step.

Step 6: The terminal device reports the aforementioned monitoring results to the management side based on the aforementioned reporting condition and strategy.

The concrete implementation process is identical with the $2^{nd}$ working example, and detailed description is omitted.

Step 7: The aforementioned management side performs management on the terminal device according to the aforementioned reporting results.

After receiving the message reported by the terminal device, the management side learns about the monitoring results reported on the terminal device based on the Alert type information in the aforementioned message. It then acquires the value of the management object on the terminal device, based on the Alert message reported by the terminal device, and updates the value of the corresponding management object recorded within. If the management side did not get an Alert type message, then it does not confirm the content reported by the terminal.

The $4^{th}$ working example is provided according to the aforementioned method of the present invention. The core of this working example is to implement terminal device management through terminal device monitoring offline parameter modification. Many connection parameters and operation parameters on the terminal are saved as management objects placed on the device management tree. Monitoring these parameters may be implemented via the monitoring management object node. For those parameters not stored on the device management tree, the monitoring flow is similar with the monitoring flow of monitoring management object node. However, it is more complicated for the monitoring engine to access the parameter; In order to access the parameter, it will be necessary to use the interface provided by the transfer firmware or other ENBL components. The concrete interface technology depends on the terminal implementation.

Figure 11:
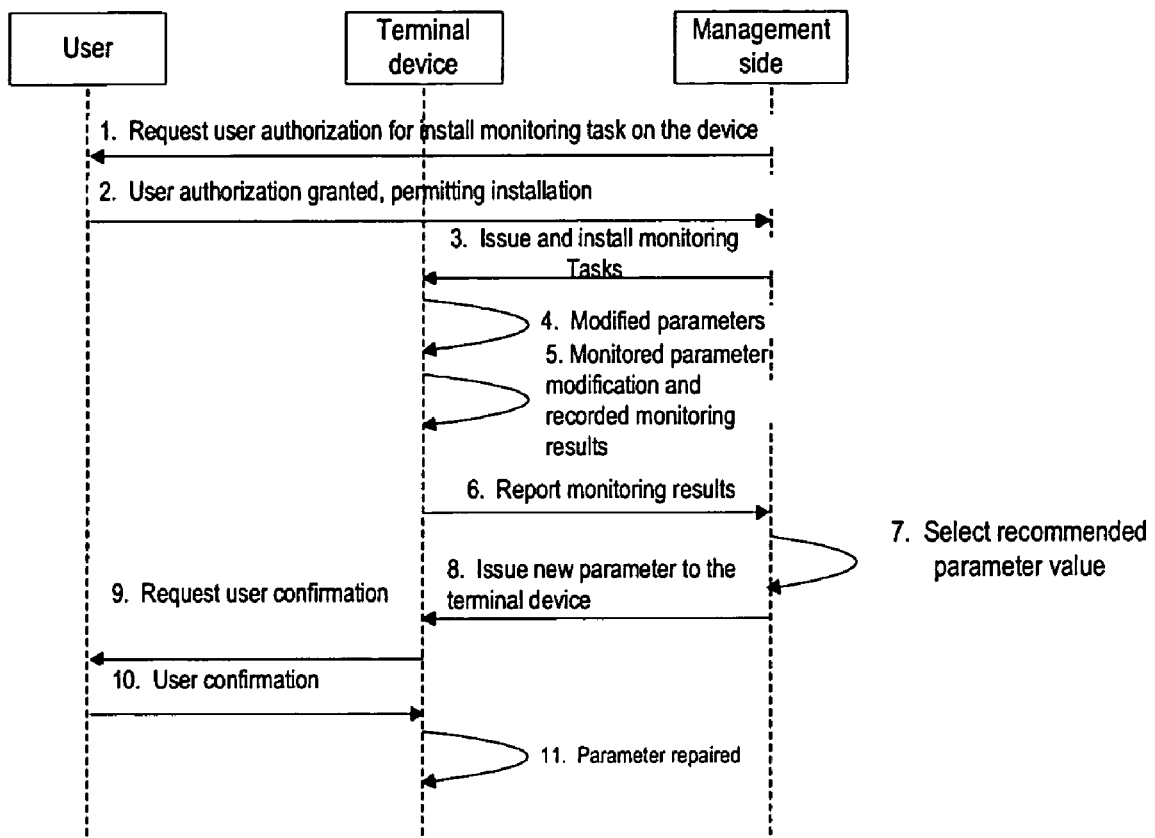
FIG. 11 is a flowchart of the $4^{th}$ working example provided by the present invention.

The implementation process of the $4^{th}$ working example provided by the present invention, as shown in FIG. 11, includes the following.

Step 1: The management side requests user grant authorization for issuing monitoring tasks to the device.

Step 2: The aforementioned user authorizes when monitoring is necessary. That is, the user permits the management side to issue monitoring tasks.

Step 3: The management side issues monitoring tasks to the terminal device, and allocates them on the terminal device.

In this working example, the differences of the process in step 3 with the relevant description in the $2^{nd}$ working example are that the aforementioned monitoring tasks not only include the appointed certain event monitoring items, the recording condition and strategy and/or reporting condition/strategy, but also include the severity levels, for example, critical (Critical), important (Important), and normal (Normal), set to the service parameter or operation parameter on the terminal device. The management side executes different management strategies according to the different severity levels of the parameter. For instance, if the parameter monitored by the management side is within the normal range, then no management execution is performed, which allows the modification made by the user to the parameter. If the parameter reported by the terminal is Critical, then, once the management side monitors the change of the parameter, it immediately issues a new parameter to repair. If the severity of the parameter of the terminal is Important, then, when the management side monitors parameter change, it handles the issue accordingly. For example, it issues a new parameter to repair at certain time point, or repairs this service parameter when the terminal device needs to use it.

Step 4: The Offline allocation parameter in the terminal device is modified.

The allocation parameter of the terminal device may be modified by a user or certain applications on the terminal device. Step 5: Based on the monitoring items, the terminal device monitors and acquires the offline parameter on the terminal device that is being modified. It then records the monitoring results according to the aforementioned recording condition and strategy. Meanwhile, the terminal device may execute other management operations, such as alert the user that such modification to the parameter may cause some inconvenience.

In step 5, when the monitoring item is the terminal device monitoring the offline modification of allocation parameters on the terminal by the user or the application on the terminal device, the concrete monitoring process includes two scenarios.

The first scenario is that the terminal device collects allocation parameters in the preset event information collecting point, analyzes the parameters, and acquires the modification information of the allocation parameters in the terminal device.

The second scenario is that the terminal device acquires operation parameters/allocation modification information through receiving messages in real-time reported by the firmware.

Step 6: The terminal device reports the aforementioned monitoring results to the management side, according to the aforementioned reporting condition and strategy. The concrete implementation process is identical with the relevant description in the $2^{nd}$ working example, therefore there is no need for a detailed description.

Then, the management side adopts the corresponding management strategy according to the aforementioned reporting results, and manages the terminal device based upon the aforementioned management strategy. The concrete implementation process is as follows.

Step 7: The management side establishes the corresponding management strategy based on the parameter severity level, and selects the adequate parameter value.

Step 8: The management side issues the recommended new parameter value to the terminal device.

Step 9: The terminal device request user confirmation to see if the user is willing to update the modified parameter to the recommended value issued from the management side.

Step 10: If the user permits, then send confirmation message to the terminal device.

Step 11: The terminal device updates the parameter value being modified to the new parameter value.

It is clear from the aforementioned concrete implementation proposal of the present invention that terminal events may be monitored and acquired by the present invention, and, based on the acquired terminal event, the present invention performs management of the terminal device. Thus, the impact of terminal events on the terminal devices can be prevented and eliminated in a timely fashion, which reduces the probability of the occurrence of errors on the device, thus improving the service quality of the service provider.

In conclusion, while the presently preferred embodiment of the present invention has been shown and described, it is to be understood that this disclosure is for the purpose of illustration and that various changes and modifications may be made without departing from the scope of the invention as set forth in the appended claims, by people in the art. Therefore, the scope of protection of the present invention should be subject to the scope of protection of the claims.

What is claimed is:

1. A method of management of terminal devices characterized by including:

receiving monitoring tasks issued by a management side based on a device management (DM) protocol, wherein the monitoring tasks are adapted to indicate a terminal device to monitor applications which are installed or updated on the terminal device via a non-DM mode;

installing the monitoring tasks to a device management (DM) tree in the terminal device for monitoring the terminal device under offline conditions;

monitoring and acquiring original application information on the terminal device through querying and analyzing an application table or system logs;

monitoring and acquiring current application information on the terminal device through querying and analyzing a current application table or current system logs, and then removing the application information installed via a DM mode from the acquired current application information;

comparing the original application information with the current application information installed via the non-DM mode;

recording and reporting the installed or updated applications information via the non-DM mode of the terminal device to the management side based on the DM protocol, after establishing communication with the management side; and carrying out management commands issued by said management side on the basis of said installed or updated applications information via the non-DM mode of the terminal device for preventing adverse impact of the events on the terminal device.

2. The method according to claim 1, wherein said monitoring tasks including:

one or more of the following: a number of event monitoring items, recording conditions, and reporting conditions and strategies.

3. The method according to claim 2, wherein the monitoring tasks issued and installed through a Replace command based on the DM protocol.

4. The method according to claim 2, wherein the installing process comprising: configuring a subtree under the DM tree in a terminal device.

5. The method according to claim 4, wherein the installing process comprising:

storing one event monitoring item under a X node of the subtree;

storing identification information of the event monitoring item in EventID node under the X node, and storing content of the event monitoring item in a Content node under the X node.

6. The method according to claim 5, wherein the installing process comprising: storing reference values for the event monitoring item in a Reference node under the X node.

7. The method according to claim 5, wherein the installing process comprising: storing the recording conditions of the event monitoring item in a Record/Condition node under a Record node, wherein the Record node is under the X node.

8. The method according to claim 7, wherein after the monitoring and acquiring process comprising: storing the value of the monitored events according to the recording conditions in a Record/Value node under the Record node.

9. The method according to claim 5, wherein the installing process comprising: storing the reporting conditions of the event monitoring item in a Report/Condition node under a Report node, wherein the Report node under the X node.

10. The method according to claim 9, wherein the reporting process comprising: storing the value of the monitored events according to the reporting conditions in a Report/Value node under the Report node, and reporting the monitored events according to the reporting conditions.

11. The method according to claim 5, wherein the carrying process comprising: starting or stopping the monitoring process by changing the value of an Enabled node under the X node.

12. The method according to claim 1, wherein prior to the monitoring and acquiring process comprising: receiving a monitoring event authorization request issued by the management side, and obtaining an authorization granted by a user.

13. The method according to claim 2, wherein the monitoring tasks further comprising: severity levels, different management commands are carried out by the terminal device according to the different severity levels.

14. The method according to claim 1, wherein the reporting process further comprising: reporting the monitored events to the management side via a Generic Alert message based on the DM Protocol, wherein the Generic Alert message comprises an Alert type, a data source Uniform Resource Identifier (URI), and an integer return code.

15. A system for management of terminal devices comprising:

a terminal device configured for communicating with a management side, wherein the terminal device comprises a device management (DM) agent unit for receiving monitoring tasks issued by the management side based on a DM protocol, wherein the monitoring tasks are adapted to indicate the terminal device to monitor applications which are installed or updated on the terminal device via a non-DM mode for preventing adverse impact of the events on the terminal device; and a monitor engine for carrying out an allocation of the monitoring tasks to a Device Management (DM) tree in the terminal device for monitoring the terminal device under offline conditions; monitoring and acquiring original application information on the terminal device through querying and analyzing an application table or system logs; monitoring and acquiring current application information on the terminal device through querying and analyzing a current application table or current system logs, and then removing the application information installed via a DM mode from the acquired current application information; comparing the original application information with the current application information installed via the non-DM mode; recording and reporting the installed or updated applications information via the non-DM mode of the terminal device to the management side based on the DM protocol, after establishing communication with the management side; and carrying out management commands issued by the management side on the basis of said installed or updated applications information via the non-DM mode of the terminal device for preventing adverse impact of the events on the terminal device.

16. The system according to claim 15, wherein said management side including a monitoring task management unit for issuing the monitoring tasks to said terminal device.

17. The system according to claim 16, wherein said management side also including a monitoring result processing unit, for deciding a corresponding management operation on the terminal device, on the basis of monitoring results reported by the terminal device.

18. The system according to claim 16, wherein said monitoring engine comprises an allocation unit for carrying out an allocation of the monitoring tasks to the DM tree in the terminal device, wherein the monitoring tasks comprising: one or more of the following: a number of event monitoring items, recording conditions, and reporting conditions.

19. The system according to claim 18, wherein the DM tree comprising a subtree.

20. The system according to claim 19, wherein the subtree comprising a X node for storing one event monitoring item; an EventID node under the X node for storing identification information of the event monitoring item; and an Content node under the X node for storing content of the event monitoring item.

21. The system according to claim 20, wherein the subtree comprising a Record node under the X node, wherein the Record node comprises a Record/Condition node for storing the recording conditions of the event monitoring item, and a Record/Value node.

22. The system according to claim 21, wherein the subtree comprising a Report node under the X node, wherein the Report node comprises a Report/Condition node for storing the reporting conditions of the event monitoring item, and a Report/Value node.

23. The system according to claim 22, wherein the monitoring engine further comprising:
- a monitoring unit for monitoring and acquiring events generated in the terminal device according to event monitoring item stored in the content node;
- a recording unit for recording the monitored events according to the recording conditions stored in the Record/condition node, and storing it in Record/Value node; and
- a reporting unit for reporting the monitored events according to the reporting conditions stored in the Report/condition node, and storing it in Report/Value node.

* * * * *

UNITED STATES PATENT AND TRADEMARK OFFICE
CERTIFICATE OF CORRECTION

PATENT NO. : 7,604,162 B2 Page 1 of 1
APPLICATION NO. : 11/482506
DATED : October 20, 2009
INVENTOR(S) : Kepeng Li et al.

It is certified that error appears in the above-identified patent and that said Letters Patent is hereby corrected as shown below:

Title Page, Item (75), Inventors, after "Guiyu Zhao, Shenzhen," delete "(KR)" and insert --(CN)--

Signed and Sealed this

Fifth Day of January, 2010

David J. Kappos
*Director of the United States Patent and Trademark Office*